(12) United States Patent
Itomlenskis

(10) Patent No.: US 11,030,916 B2
(45) Date of Patent: Jun. 8, 2021

(54) GAME FOR TEACHING DESIGN THINKING THROUGH THE USE OF CHARACTERS AND ENVIRONMENTS

(71) Applicant: Larissa Itomlenskis, Lyndhurst, OH (US)

(72) Inventor: Larissa Itomlenskis, Lyndhurst, OH (US)

(*) Notice: Subject to any disclaimer, the term of this patent is extended or adjusted under 35 U.S.C. 154(b) by 280 days.

(21) Appl. No.: 15/795,625

(22) Filed: Oct. 27, 2017

(65) Prior Publication Data

US 2018/0122262 A1 May 3, 2018

Related U.S. Application Data

(60) Provisional application No. 62/414,523, filed on Oct. 28, 2016.

(51) Int. Cl.

| | |
|---|---|
| *G09B 19/00* | (2006.01) |
| *G09B 19/22* | (2006.01) |
| *G09B 7/02* | (2006.01) |
| *G09B 3/02* | (2006.01) |
| *G09B 21/00* | (2006.01) |
| *A63F 13/85* | (2014.01) |
| *G06F 16/438* | (2019.01) |

(52) U.S. Cl.
CPC .............. *G09B 19/00* (2013.01); *A63F 13/85* (2014.09); *G09B 3/02* (2013.01); *G09B 7/02* (2013.01); *G09B 19/22* (2013.01); *G09B 21/003* (2013.01); *G09B 21/006* (2013.01); *A63F 2300/8094* (2013.01); *G06F 16/438* (2019.01)

(58) Field of Classification Search
CPC .......... G09B 19/00; G09B 19/22; G09B 3/02; G09B 21/00; G09B 21/003; G09B 21/006; A63F 13/85; A63F 2300/8094; B09B 7/00; B09B 7/02; G06F 16/438; G06F 16/43
See application file for complete search history.

(56) References Cited

U.S. PATENT DOCUMENTS 6,626,675 B1 * 9/2003 Webber .................... G09B 1/02
434/156

* cited by examiner

*Primary Examiner* — Timothy A Musselman
(74) *Attorney, Agent, or Firm* — Dinsmore & Shohl, LLP

(57) ABSTRACT

A design system includes a protocol of rules and a game apparatus. The game apparatus includes paper, cards, or an electronic device. The protocol includes instructions that prompt a user to create characters and environments. Characters may be paired with environments and goals are set for the characters. Obstacles are identified and solutions to the obstacles are created. A visual story is created based on the game.

10 Claims, 17 Drawing Sheets

CHARACTER: a tropical fish 24
ENVIRONMENT: an active volcano!

Keep the same character and environment for the entire scenario. Mark them at the top of every page.

OBSTACLES:

Think about the environment your character is in. What problems will come up? What things will make it tough for the character to get to their goals?

23

(H)OT, O REALLY REALLY HOT.
↑ DANGEROUS!

- NO FOOD IN A VOLCANO... THAT I KNOW OF...
- NO FRIENDS CLOSE BY...
- NO WATER! HOW CAN HE SURVIVE???
- HOW CAN HE TALK TO HIS FAMILY BACK HOME...?
- DO SCIENTISTS STUDY THIS VOLCANO...? MAYBE THEY CAN HELP?

Example

FIG. 5B

CHARACTER: a tropical fish  24
ENVIRONMENT: an active volcano!

SOLUTIONS:

Look over the obstacles you listed. What are some ideas to help fix a problem that your character has?
We call these solutions.

25

SPECIAL SUIT — GOGGLES
THAT LETS HIM BREATHE

GIANT SKI LIFT TYPE OF THING

HOME — HIS FRIENDS HOUSE

GAME FOR TEACHING DESIGN THINKING THROUGH THE USE OF CHARACTERS AND ENVIRONMENTS

CROSS-REFERENCE TO RELATED APPLICATIONS

This application claims priority to U.S. Provisional Patent Application No. 62/414,523 entitled "GAME FOR TEACHING DESIGN THINKING THROUGH THE USE OF CHARACTERS AND ENVIRONMENTS," filed on Oct. 28, 2016, each of which is incorporated herein by reference in its entirety.

TECHNICAL FIELD

The present teachings relate to methods, systems, and apparatuses for teaching, and more particularly, to a game for teaching design thinking through the use of characters and environments.

BACKGROUND

There are many resources that attempt to teach design thinking to users, such as students. These resources suffer from a number of drawbacks including the following categories: too technical, confusing or dull; too juvenile and thus not engaging enough to hold the attention of the user; require an adult to supervise or direct the learning activity, and thus cannot be used without assistance; too expensive; not challenging enough or not directly relevant to the actual problem-solving skills used in professional design; too constraining in that they do not provide space for enough creative exploration and ideation.

Examples of such resources include electronics kits, games, and online educational materials. Examples of electronics kits are the products made by the companies Arduino and Little Bits as well as the group Technology Will Save Us. These kits include circuit boards, motors, buzzers, sensors, lights, and other electrical parts that allow the user to construct various simple electronic devices that achieve a specific result. Some examples of what can be made include simple musical devices, small mechanical robots or toy cars, mobiles that rotate and light up, and other basic machines. The price per kit can range from around 30 dollars to over a hundred dollars, making them prohibitively expensive for many as learning tools for children and teens.

Electronics kits are complex, and thereby somewhat intimidating. The complexity is a barrier to the product being used independently for some young people. While these kits allow kids and adults to learn about technology and design through building and play, they do not necessarily teach people to explore the needs of a central product user. These kits do not focus on using empathy to create solutions. The actual things that can be designed using the kit are limited to the parts enclosed and the technology itself.

IDEO Method cards are intended for a narrow adult audience. The cards offer prompts for workplace teams to explore new approaches to research and development within their organization. The cards are written for a professional audience, not for young people. The game lacks adventure. It comes off as an odd, dry, and somewhat irrelevant work exercise. The cards are a brainstorming tool, so there is much flexibility in how they are used and what the outcome should be. The fact that there is no clear deliverable is a drawback for a young audience of approximately 9 to 14 years old.

The STORYMATIC is an accessible creative writing and storytelling game. The game is accessible to a young audience of approximately ages 9 to 14. Certain versions of the game may be played independently. But STORYMATIC does not really link to design methods, and does not explicitly have the game user explore needs and goals of a central product user or character.

Therefore, a need exists for improved methods, systems, and apparatuses for teaching design thinking to an audience. It may be desirable for such methods, systems, and apparatuses to be accessible for young audiences, economical, portable, capable of independent use without instructors, and less restrictive on possible outcomes.

SUMMARY

A design system for facilitating generation of a media story, comprises a card set comprising a character card set and an environment cart set, wherein each character card of the character card set comprises a back side and a face side, the face side of each character card comprising prompts that instruct a user to provide character traits, and wherein each environment card of the environment card set comprises a back side and a face side, the face side of each environment card comprising prompts that instruct a user to provide environment traits. The design system may include a story map comprising a series of prompts that prompt game actions. The series of prompts include instructing the user to select at least one character card and at least one environment card, instructing the user to identify the character traits of the selected at least one character, instructing the user to identify the environment traits of the selected at least one environment, at least one goal for the at least one character, identifying at least one obstacle for the at least one character based on the at least one environment, identifying at least one solution for the at least one character based to overcome the at least one obstacle, selecting an obstacle of the at least one obstacle and a solution from the at least one solution. In another aspect, the series of prompts include instructing generation of a story as a media representation comprising at least one of a series of frames, video, or audio. The face side of each environment card comprises a prompt for instructing input of a visual representation of an environment, and wherein the face side of each character comprises a prompt for instructing input of a visual representation of a character.

A design system for facilitating generation of a media story is disclosed. The system includes a processor coupled to a memory, the memory storing computer executable instructions, wherein the processor executes the computer executable instructions to: prompt a user to create a character by providing a form to describe traits of said character and provide a prompt to assigning a name for the character; iterate the prompt to create a character and assign a name for each character; prompt the user to create an environment by providing a form to describe traits of said environment and assign a name to the environment, iterate the prompt to create an environment and assign a name for each environment; prompt the user to choose one of the characters from all created and one of the environments from all created; associate the chosen one of the characters with the chosen one of the environments; and prompt the user to provide input that is utilized to generate a story to achieve a goal for the chosen one of the characters with the chosen one of the environments. In another aspect, the processor executes the computer executable instructions to prompt the user to enter at least one goal for the chosen said character in chosen said environment; prompt the user to enter at least one obstacle for the chosen said character that will be encountered in the chosen said environment; prompt the user to enter at least one potential solution for the at least one obstacle; generate a multimedia story based on the at least one potential solution for the at least one obstacle.

A story path apparatus for a generation of a media story is disclosed. The story path apparatus includes a plurality of path pieces, wherein each of the plurality of path pieces comprises at least one prompt for a user to identify at least one of a trait of a character, a trait of an environment, or an obstacle for the character based on the environment; and wherein the plurality of path pieces are operatively coupled together to form a path comprising a series of instructions. Each of the path pieces comprises at least one of wood, plastic, paper, board, or other material. A path piece comprises an erasable surface. The story path apparatus can include a goal piece that is operatively coupled to at least one path piece of the plurality of path pieces.

DESCRIPTION OF THE DRAWINGS

The present teachings may be better understood by reference to the following detailed description taken in connection with the following illustrations, wherein:

FIG. 5B is an exemplary page of a paper-based design system showing prompts for entry of at least one obstacle in accordance with various disclosed aspects;

DETAILED DESCRIPTION

Figure 1A:
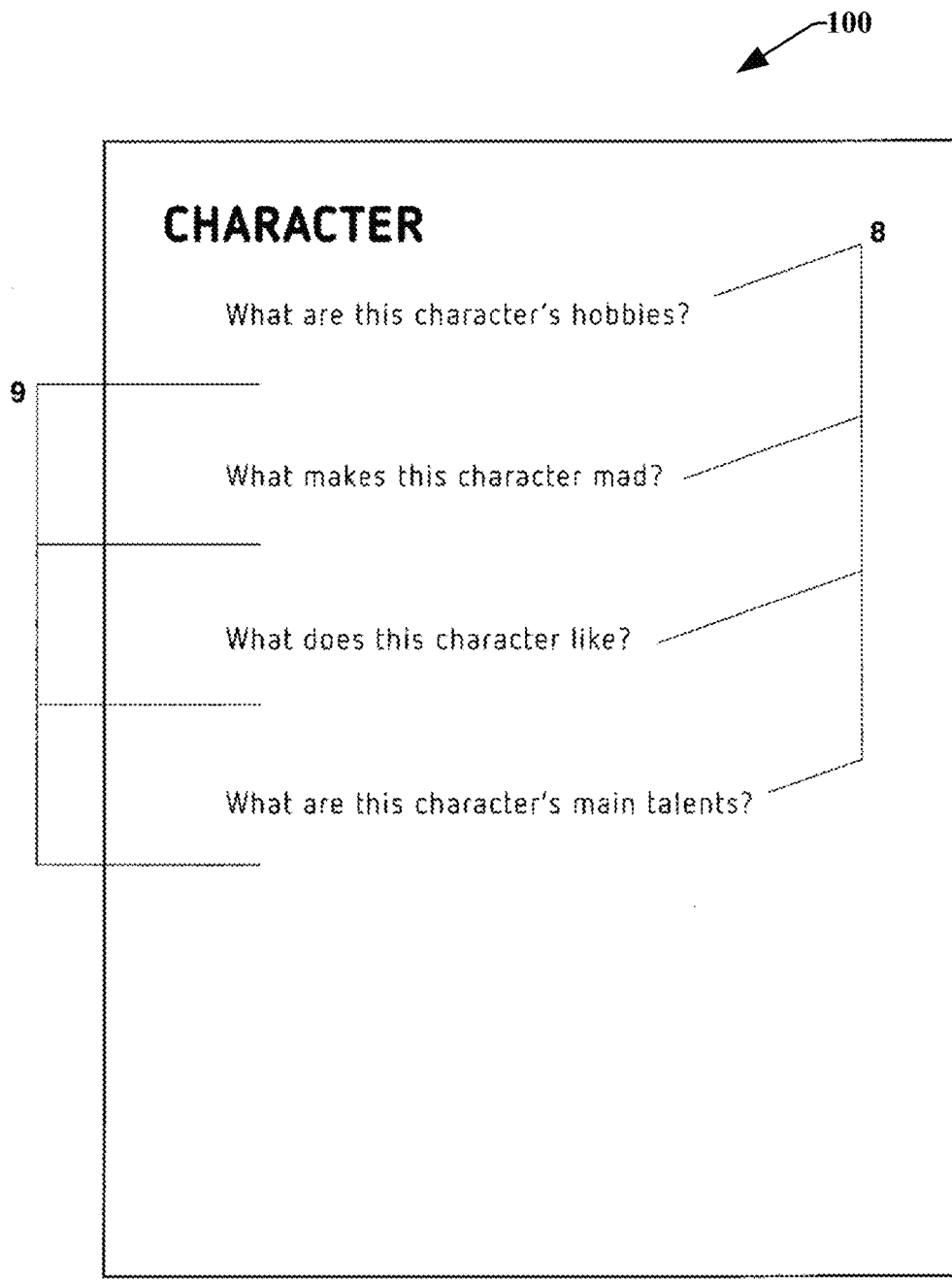
FIGS. 1A-1B are exemplary pages of a paper-based design system showing prompts for information associated with a character in accordance with various disclosed aspects.
Figure 1B:
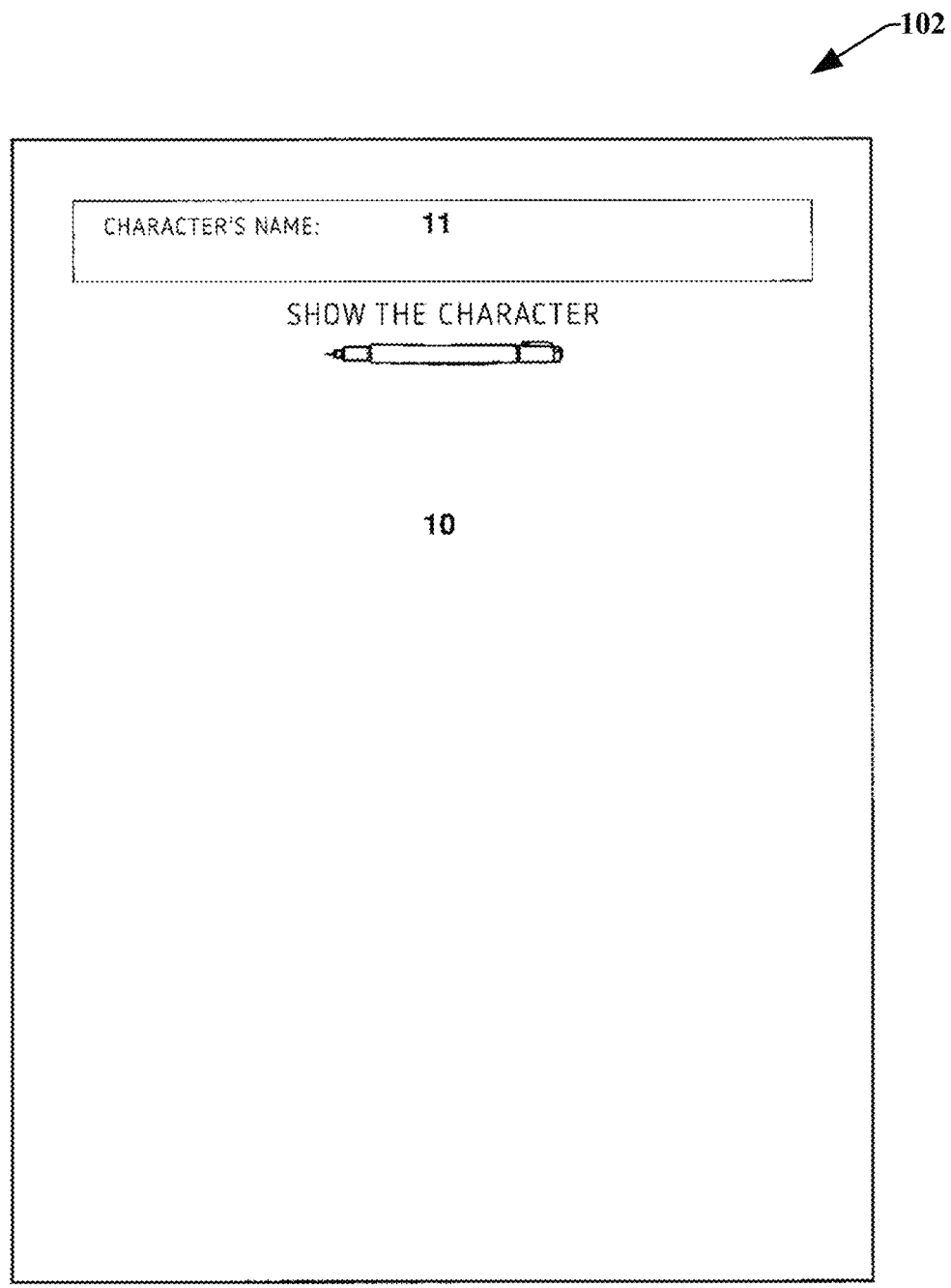

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

Moreover, terms such as "access point," "server," and the like, are utilized interchangeably, and refer to a network component or appliance that serves and receives control data, voice, video, sound, or other data-stream or signaling-stream. Data and signaling streams may be packetized or frame-based flows. Furthermore, the terms "user," "student," "audience," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference).

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device(s) owned by the user. The user account may also include information such as relationships with other users, application usage, location, personal settings, and other information.

Embodiments may utilize substantially any wired or wireless network. For instance, embodiments may utilize various radio access networks (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, xth generation long-term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand-held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the like. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

Some traditional learning systems include expensive electronics. Others may require complicated instructions that typically require an instructor. Yet others use restrictive rules that do not foster creativity. These and many other shortcomings are addressed by disclosed embodiments.

For instance, various aspects of this disclosure provide a structure for a user that leads the user through a simple, accessible and participatory brainstorming and design exercise through described methods and apparatuses. In an exemplary design system, the user is prompted to select or design one or more characters. The system may also prompt the user to select or design one or more environments. The system may prompt the user to select or identify one or more possible goals, obstacles, and/or solutions for a particular character and environment combination. Additionally, the system may prompt the user to enter frames to create visual representations of a story through intuitive instructions that may be rendered as a map.

As described herein, the system prompts a user to investigate goals and obstacles of the character for particular environments. In this and various other aspects, the system may provide a user with challenges to develop skills that are needed in professional design studios. The character is a stand-in for a real-life end user who may face real-world challenges and have real world goals. The learning within the game is relevant to real-world context, as it presents a structure for a full design process.

The process of communicating, creating and imagining the goals and obstacles for a character requires empathy, imagination, and analytical skills. The system enables the user to review the character's goals and obstacles in order to generate ideas for solutions. Having the user create a connection between goals, obstacles, and solutions encourages the type of complex thinking that is required in many 21st century jobs. Moreover, the structure of disclosed embodiments exercise both divergent and convergent thinking. Divergent thinking refers to the process of exploring many possible solutions or other ideas (e.g., brainstorming). Convergent thinking refers to the process of identifying an appropriate solution out of a number of possible solutions or other ideas. As an example, disclosed embodiments may prompt a user to brainstorm for any number of solutions for a character to achieve a goal in an environment. The generation of these solutions is an example of divergent thinking. Embodiments may then ask a user to select one or more of the solutions. This process of narrowing the solutions is an example of convergent thinking. It is noted that convergent and divergent thinking are exercised by various other aspects of disclosed embodiments as described herein.

In another aspect, the systems and methods described herein provide a simple series of steps in clear and easy to follow formats, with minimal technical language. For instance, prompts may be understood by young audiences, such as audiences between 9 and 14 years of age. While embodiments may refer to particular age groups, it is noted that any age group may utilize aspects disclosed herein.

Moreover, as the system is structured to include a series of open-ended prompts that allow a user to provide any appropriate answer, no two users are likely to use the system to produce the same results. As used herein, "open-ended prompts" generally include questions or instructions that provide a general structure but do no have rigid or overly detailed requirements. For instance, embodiments may prompt a user to "think of a goal for a character," as opposed to providing a user with predetermined goals or providing detailed instructions as to what a goal must be. As such, the structure celebrates the uniqueness of each player's responses and provides a level of individualization that is not present in traditional systems.

In another aspect, the system encourages users to exercise brainstorming techniques. Brainstorming is the practice of generating many ideas quickly. One tenet of brainstorming is to defer judgment during the ideation process, as judgments during this time stop ideas from flowing well. The ability to generate many ideas quickly is important when working as a professional designer, and this game provides practice for this important professional skill. At multiple points within this game, the user is encouraged to generate many responses to the same prompt. This system is structured to get users into the practice of generating many ideas, and not to be satisfied with the just first few ideas that one has. In embodiments, consecutive activities may facilitate development of design skills. Some of the main skills taught are brainstorming, empathy, investigation of character needs, exploration of how environmental factors affect a character, and brainstorming solutions in response to obstacles and goals.

In the various embodiments, minimal tools are required for a user. In examples, a user may only need to purchase a workbook, card deck, software application, playing board, or the like. As such, the user need not purchase expensive parts or tools as commonly required by traditional systems. According to embodiments, paper versions of the system offer learning without need for an internet connection or expensive electronics like a tablet or computer. The paper version may be provided in a compact and portable format. Such paper versions may comprise workbooks, card decks, board games, or the like. In another aspect, electronic versions may be performed via common user devices such as cell phones, which are becoming increasingly accessible. In some embodiments, the user device may not need a network connection to run software. For example, the system may run completely offline. This may allow users to utilize old cellphones that do not have cellular service.

While prompts are shown as text, it is noted that prompts may be in audio formats (e.g., mp3 or other playable formats). This is useful for users with limited reading ability or the visually impaired. To make this game accessible to those with limited vision, users can create physical sculptures of their characters and environments out of clay, paper, or other materials. Other parts of the game may be similarly adapted, so that those with limited reading or limited vision may fully participate. Game directions may be read to the user through a recorded application in the game. Users may explore their scenario and fill in their Story Map by explaining their ideas verbally.

As used herein, the term "scenario" generally refers to a pairing of an environment(s) with a character(s). As such, scenarios are generally open-ended and allow a user to create unique experiences. In this manner, the structure of the described embodiments provide a user with opportunities to develop creativity, problem solving skills, and other skills/techniques that may be applicable in professional environments as in accordance with various disclosed aspects.

Turning to FIGS. 1A-5C, there are exemplary pages of a book for a design system. The pages may be bound together, separate from each other, printable with a computer and printer, or the like. In another aspect, the design system may be described as a "game" or a series of steps for purposes of explanation. A game generally includes disclosed apparatuses and protocols associated with the apparatuses that instruct a user, computer, machine, or the like on actions to be completed via the disclosed apparatuses.

It is noted that associated methods or processes are not limited by the order of described steps unless stated otherwise or suggested by context. It is further noted that some actions may occur in different orders or concurrently with other blocks. Moreover, different actions may be utilized to implement the methods described hereinafter. Various actions may be completed by one or more of users, mechanical machines, automated assembly machines (e.g., including one or more processors or computing devices), or the like.

Referring to FIG. 1A, sheet 100 prompts a user for information regarding character traits 8 through one or more questions 8. The sheet 100 may include blanks 9 for the user to provide a response. In an aspect, the user may provide responses via text, visual representations, stickers, or the like. According to at least one embodiment, the sheet 102 shown on FIG. 1B may prompt the user to assign a name to the character in blank 11. The sheet 102 may in addition or alternatively prompt the user to create a visual representation of the character at blank 10 via drawing tools, stickers, a collage, or the like.

The questions 8 may prompt a user to provide answers through a series of questions about characteristics or traits of the character. The system is structured so that the user may go between the tasks of describing character traits and creating a visual of that character and assigning a name for the character, and can do those tasks in any order. This allows much freedom for the exploration of ideas. For instance, a user may not always know what they will create when they start drawing, and so a free-form drawing can promote unexpected ideas for character traits. This structure encourages the game user to develop a full and unique character concept, rather then just naming a character they know from movies, video games, or popular culture.

The questions 8 may include, for instance, questions regarding a character's hobbies, likes, dislikes, things that anger the character, a character's talents, abilities, strengths, weaknesses, friends, etc. As noted here and elsewhere, the questions 8 may be tailored based on a theme, such as a history theme, animal theme, superhero theme, etc.

According to at least one embodiment, a game may provide one or more pages 100 and 102 such that a user may repeat the process of describing traits, creating a visual representation and assigning a name, in order to generate multiple characters. The game protocol may recommend that the user create at least i characters and no more than j characters, where i and j are numbers. In one example, the game protocol may recommend a fixed number of characters, such as five. Moreover, the game may provide additional pages and/or additional space on pages 100 and 102 if the user desires to make more additional characters. Encouraging the user to generate multiple varying responses to a prompt is one example of how this game facilitates brainstorming. In order to play the game, the user must create at least one character, at minimum. In at least one example, the character may be a person (e.g., fictional, historical, real, hypothetical, etc.), animal, weird monster, or any creature real or imaginary.

Figure 2A:
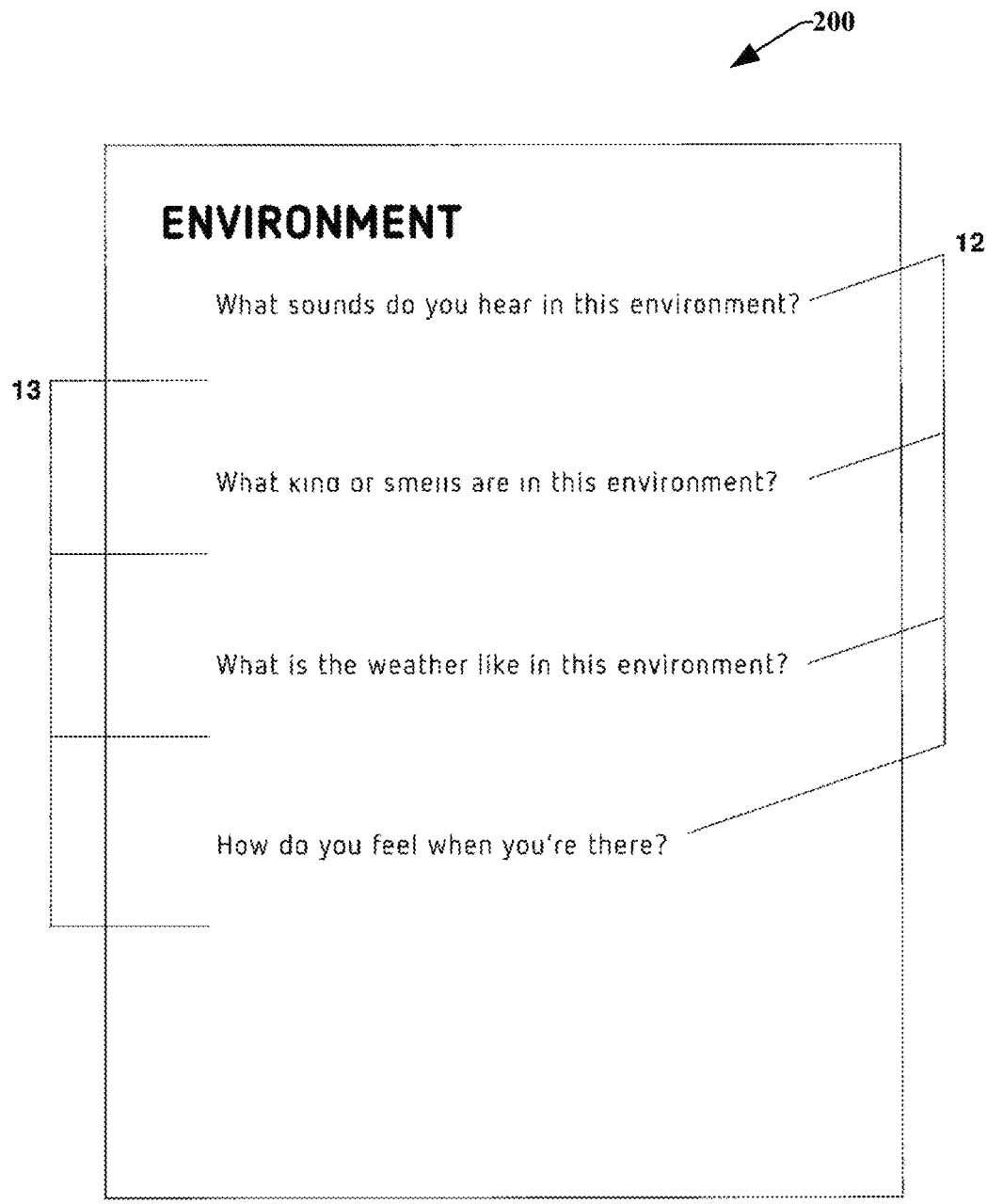
FIGS. 2A-2B are exemplary pages of a paper-based design system showing prompts for information associated with an environment in accordance with various disclosed aspects.
Figure 2B:
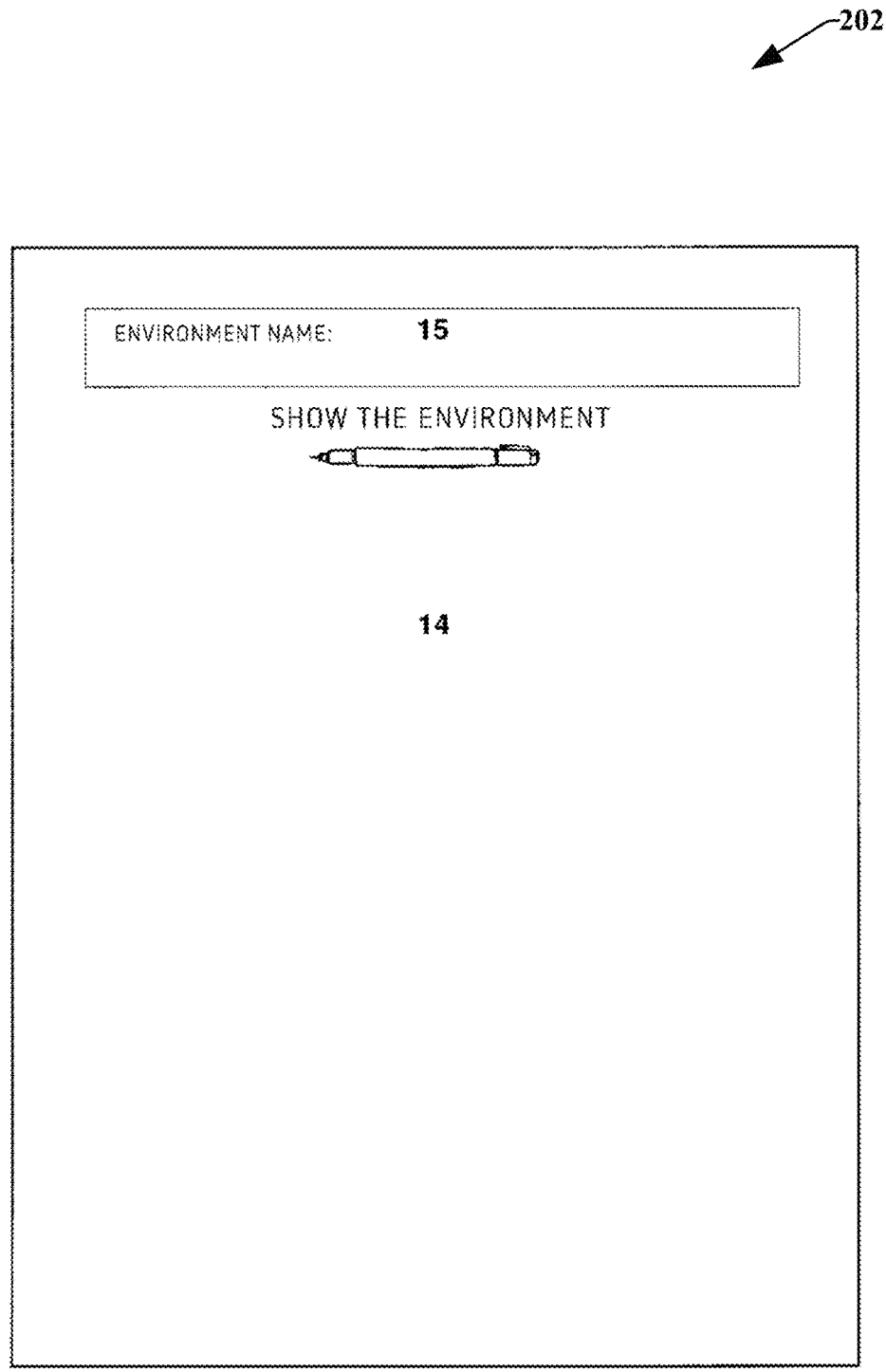

Referring now to FIGS. 2A-2B, there are sheets 200 and 202 respectively. The sheet 200 may comprise one or more questions 12 that prompt a user to enter environment traits in blanks 13. Similar to the above, the sheet 200 may comprise any number of questions 12 and corresponding blanks 13. In another aspect, the user may provide responses in blanks 13 as text, visual representations, stickers, or the like.

The questions 12 may prompt a user to provide answers through a series of questions about characteristics or traits of the environment. The system is structured so that the user may go between the tasks of describing environment traits and creating a visual of that environment and assigning a name for the environment, and can do those tasks in any order. This allows much freedom for the exploration of ideas. For instance, a user may not always know what they will create when they start drawing, and so a free-form drawing can promote unexpected ideas for environment traits. This structure encourages the game user to develop a full and unique environment concept, rather than just naming an environment they know from movies, video games, or popular culture.

The questions 12 may include, for instance, questions regarding an environment's sounds, sights, smells, weather, climate, population, flora, fauna, land formations, natural resources, or the like. As noted here and elsewhere, the questions 12 may be tailored based on a theme, such as a history theme, animal theme, superhero theme, etc. Within an exemplary game, an environment may be an imaginary place or a real place, indoors or outdoors, weird or realistic.

According to at least one embodiment, the sheet 202 shown on FIG. 2B may prompt the user to assign a name to the environment in blank 15. The sheet 202 may in addition or alternatively prompt the user to create a visual representation of the environment at blank 14 via drawing tools, stickers, a collage, or the like. Similar to the character, the environment may be described via a visual representation that may come in the form of drawing, collage, or other visual means.

According to at least one embodiment, a game may provide one or more pages 200 and 202 such that a user may repeat the process of describing traits, creating a visual representation and assigning a name, in order to generate multiple environments. The game protocol may recommend that the user create at least m environments and no more than n environments, where m and n are numbers. In one example, the game protocol may recommend a fixed number of environments, such as five. Moreover, the game may provide additional pages and/or additional space on pages 200 and 202 if the user desires to make additional environments. Encouraging the user to generate multiple varying responses to a prompt is one example of how this game facilitates brainstorming. In order to play the game, the user must create at least one environment, at minimum.

It is noted that with this game structure, advanced drawing skills are not necessary. People of any artistic ability high or low can participate fully in the game, and are encouraged to contribute and develop ideas and communicate them through visuals and written description.

Figure 3:
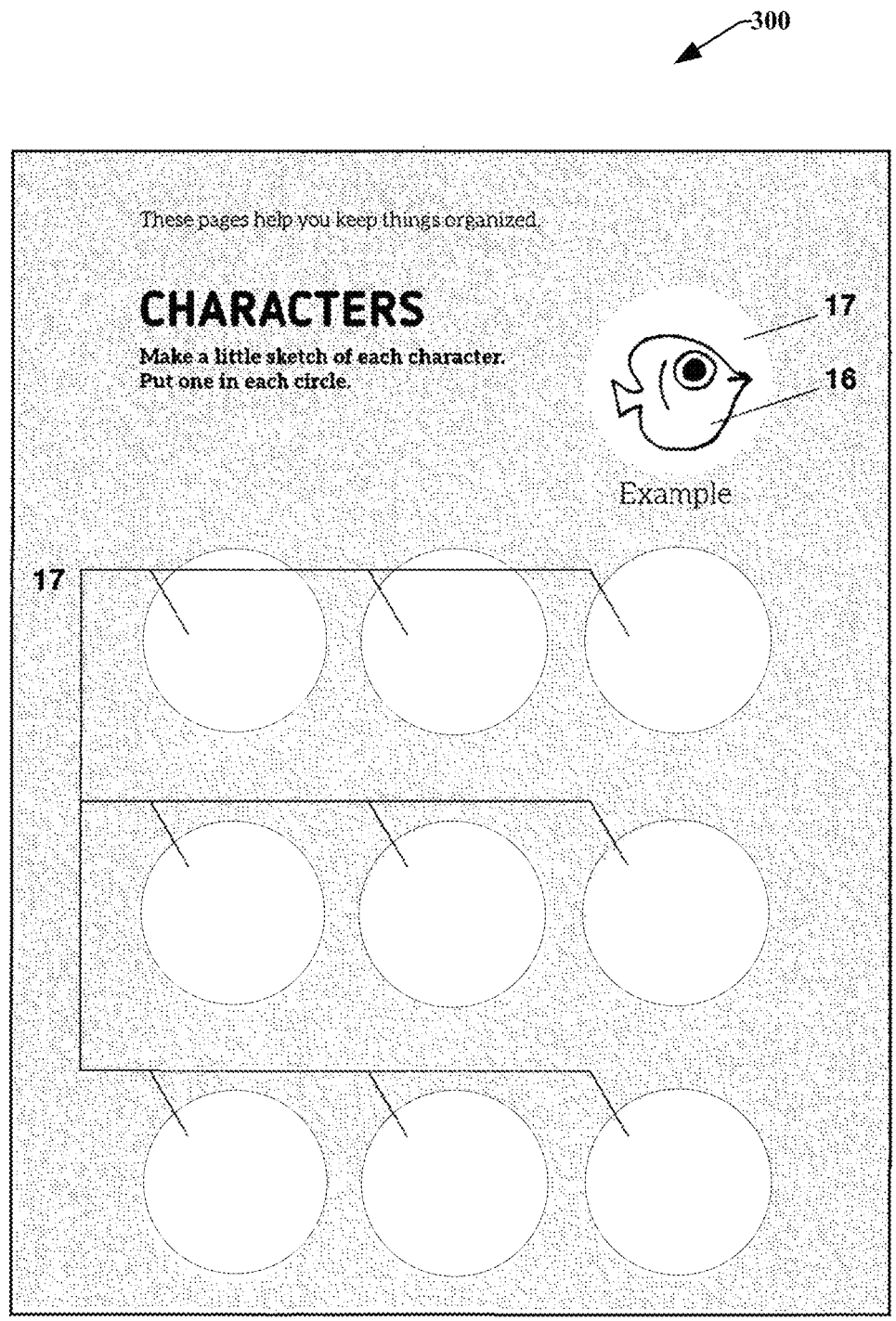
FIG. 3 is an exemplary page of a paper-based design system showing prompts for review of information associated with a character in accordance with various disclosed aspects.

FIG. 3 shows a sheet 300 that may prompt a user to input a token representation of created characters in one or more blanks 17. An example character 16 (in this case a fish) may be shown to provide instructions to the user. It is noted that the user may enter into blanks 17 character names, drawings of the character, a symbol of the character, or the like.

Figure 4:
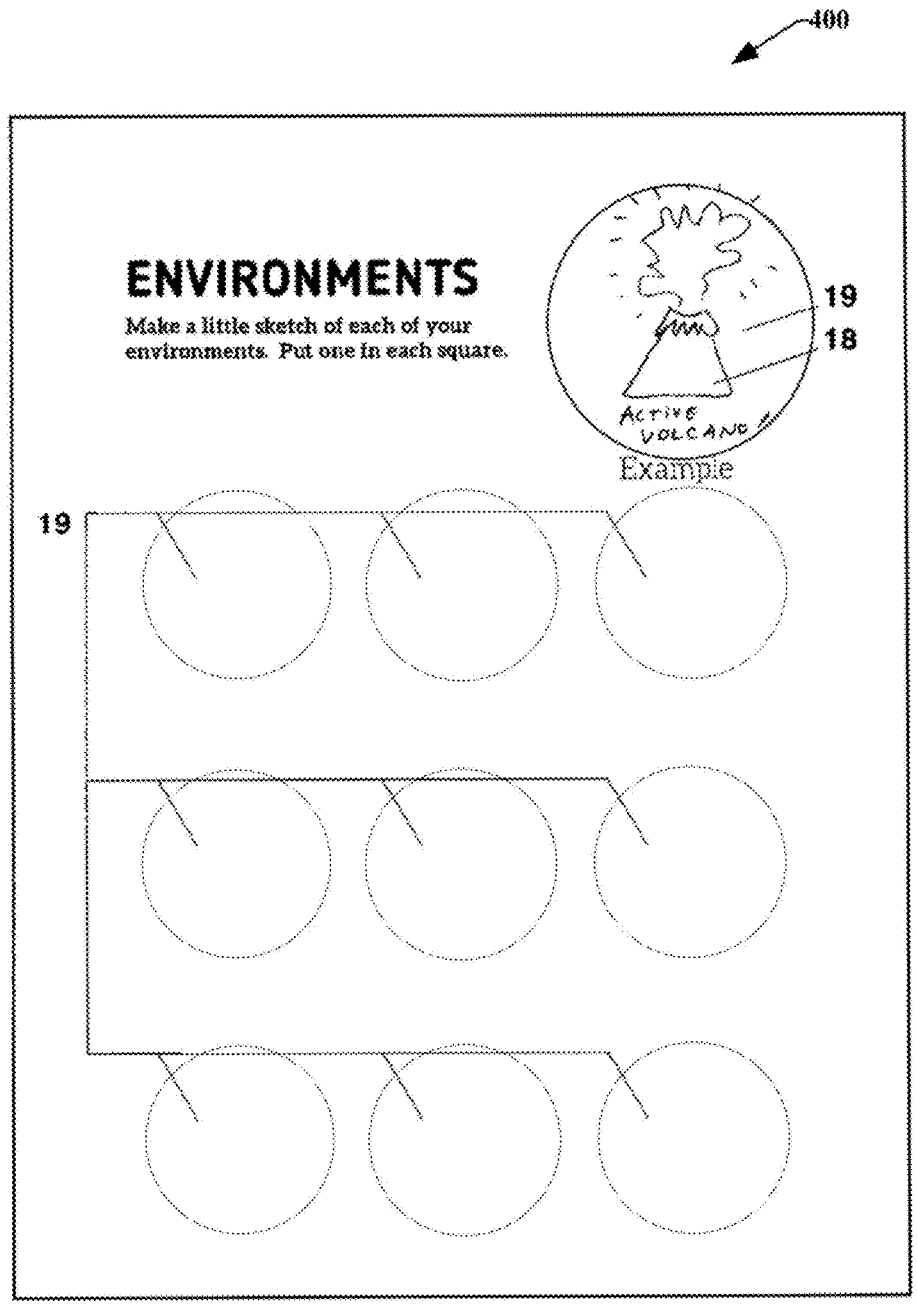
FIG. 4 is an exemplary page of a paper-based design system showing prompts for review of information associated with an environment in accordance with various disclosed aspects.

FIG. 4 shows a sheet 400 that may prompt a user to input a token representation of created environments in one or more blanks 19. An example environment 18 (in this case a volcano) may be shown to provide instructions to the user. It is noted that the user may enter into blanks 19 environment names, drawings of the environments, a symbol of the environments, or the like.

An exemplary game provides structure for the user to imagine and describe the conditions created when a character is in a specific environment. This process requires imagination, analytical skills, and empathy with the character. The investigation conducted during the game is parallel to the type of investigations done in professional design studios, though the game represents a compact, focused, and playful version of that process. In this game, the character is a placeholder for a product end-user. In another aspect, the solution is a placeholder for professional design solutions.

The user can create any pair of environment and character that they like. The match may or may not be logical. If desired, the pairing may be somewhat absurd. When the game user puts a character in an environment, it forces the user to try to imagine things from the character's point of view. In another aspect, the user may pair one or more characters together and then pair the set of characters with an environment. As such, the user may proceed with a set of characters where each has its unique characteristics. Described embodiments may allow the user to develop problems and solutions that may require collaborative efforts between characters.

Figure 5A:
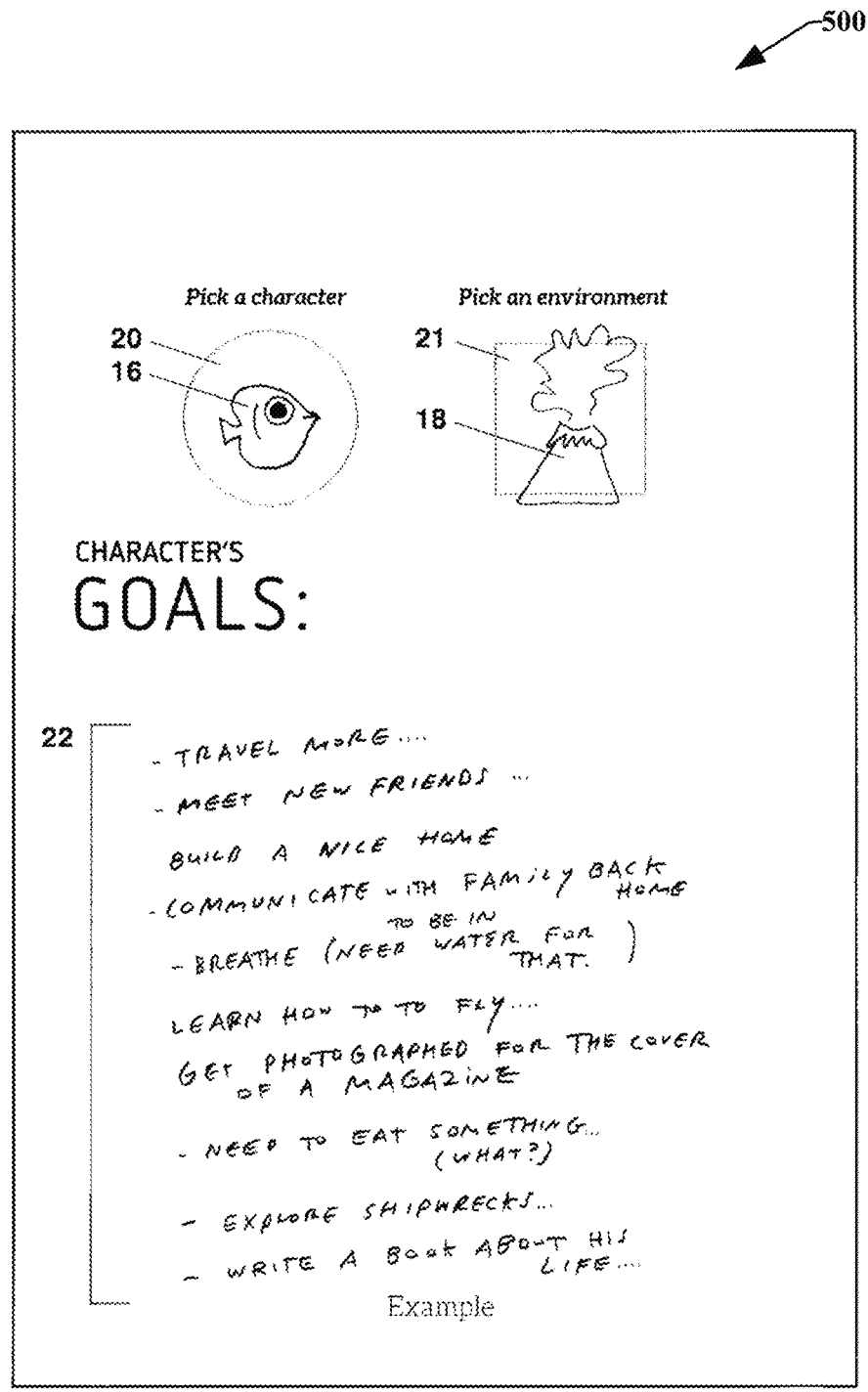
FIG. 5A is an exemplary page of a paper-based design system showing prompts for selection of a character, an environment, and at least one goal in accordance with various disclosed aspects.

Turning to FIG. 5A shows a sheet 500 that may prompt a user to identify one or more goals in blank 22 for a given set of a character 16 and an environment 18. Sheet 500 provides a blank 20 for a user to provide a representation of the character 16 and a blank 21 for a user to provide a representation of the environment 18. It is noted that the user may choose and input one or more characters 16 and one or more environments 18. In the example illustrated in FIG. 5A, the character 16 is a fish and the environment is an active volcano 18. The user may enter any possible goals. The pairing of one character and one environment makes a situation the game user will explore for the remainder of the game.

Referring now to FIG. 5B, illustrates a sheet 502 that prompts a user to create or identify obstacles for a given character-environment set. In an example, the sheet 502 may provide a prompt 24 for the user to enter representations of a character and environment. It is noted that the representation may comprise text, a visual representations, or the like. The sheet 502 provides a blank 23 for a user to respond to a prompt that asks the user to describe obstacles a character will encounter in the particular environment. The blank may receive a response as text, a visual representation, or the like.

Figure 5C:
FIG. 5C is an exemplary page of a paper-based design system showing prompts for entry of information associated with possible solutions in accordance with various disclosed aspects.
Figure 5C:
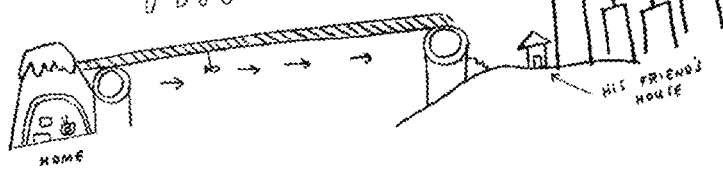

FIG. 5C illustrates sheet 504 that may comprise prompt 24 for the user to enter representations of a character and environment and a prompt asking the user to provide solutions in blank 25. The solution may relate to the obstacles described with reference to FIG. 5B and a set of the character and environment. The solution may be represented as text, a visual representation, or the like. It is further noted that the user may enter multiple possible solutions in blank 25.

In an exemplary embodiment, once chosen, the same character and environment may be used for the entire three-part exploration activity and the remainder of the game. For the first part of the exploration shown in FIG. 5A, the user brainstorms possible goals for the chosen character in the chosen environment. The game user is encouraged to communicate multiple possible goals, with the suggested amount being between five and ten goals. The user must describe one goal in order to play the game, at minimum.

For the second part of the exploration, as shown in FIG. 5B, the game user brainstorms possible obstacles for the chosen character in the chosen environment. An obstacle can be any problem for the chosen character. Space is provided for the user to create visual and/or written explanation of obstacles for the chosen character 23. The game user is encouraged to communicate multiple possible obstacles, with the suggested amount being between five and ten obstacles. The user must describe one obstacle in order to play the game, at minimum.

For the third part of the exploration, as shown in FIG. 5C, the user brainstorms possible solutions that help the character. Space is provided for the user to create visual and/or written explanation of possible solutions for the chosen character 25. The game user is encouraged to communicate multiple possible solutions, with the suggested amount being between five and ten solutions. A solution can be anything that may help the character achieve a goal or overcome an obstacle. The user must describe one solution in order to play the game, at minimum.

During this exploration, the game user is encouraged to generate multiple ideas for the same prompt. This is another example how the game facilitates brainstorming and provides structure for the user to practice this important skill. This exploration of conditions from the character's point of view has a direct connection to the process that professional designers use. A designer must do a similar exploration of conditions, goals and obstacles in order to understand their product's end-user and create a successful solution, whether the solution comes in the form of a product, service, building or other form. The user is provided directions to review all the ideas that were generated during the exploration activity and narrow them down. The user chooses: one solution, one obstacle that is surmounted or necessitated by the chosen solution, and one character goal In view of the subject matter described herein, a method that may be related to various embodiments may be better appreciated with reference to the flowchart of FIG. 6. While method 600 is shown and described as a series of blocks, it is noted that an associated method or process is not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like. Additionally or alternatively, the method 600 may be iterated any number of times to create different versions of stories.

Figure 6:
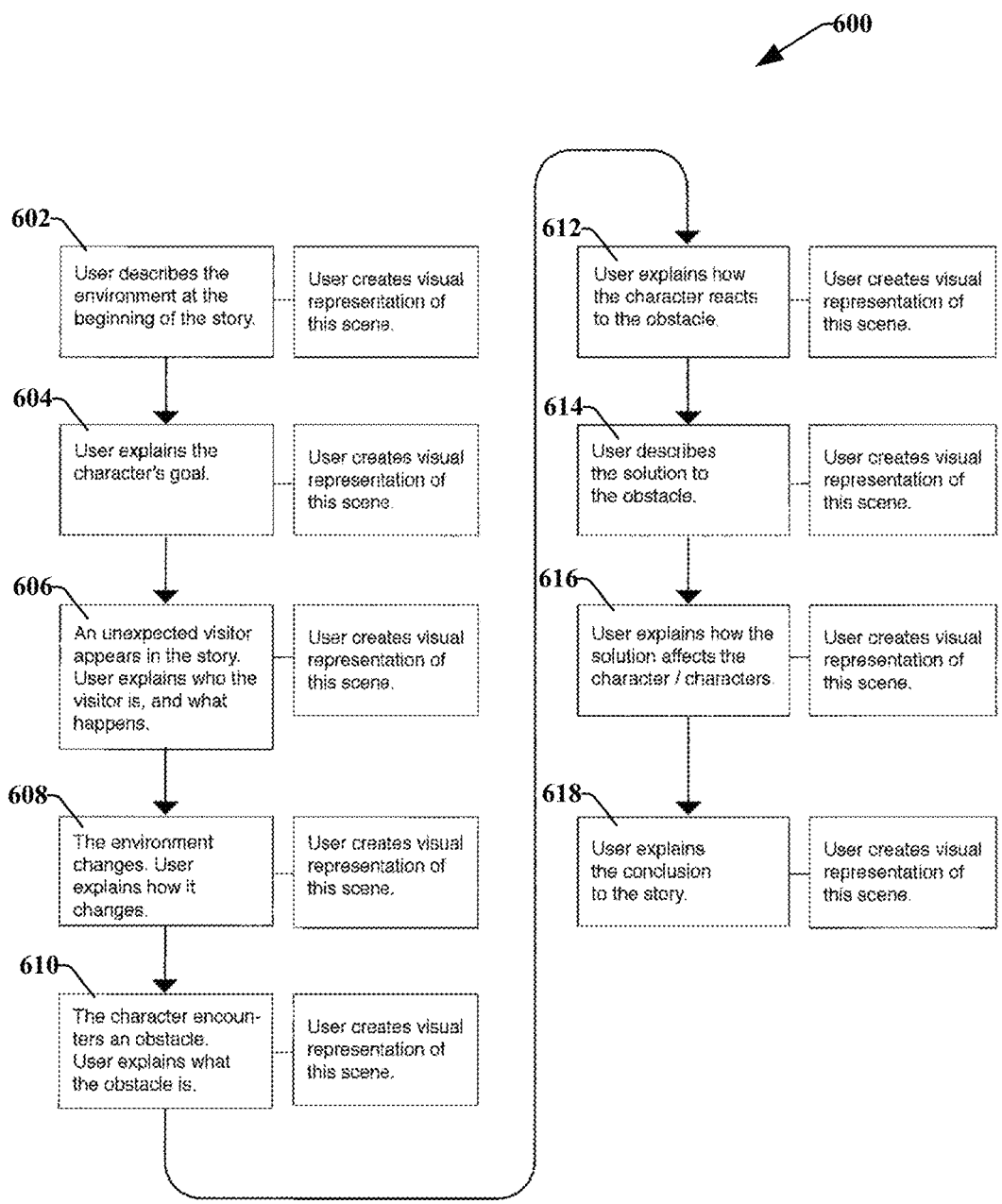
FIG. 6 is a method for creating a story draft based on information received by a design system in accordance with various disclosed embodiments.

FIG. 6 depicts an exemplary flowchart of non-limiting method 600 for creating a story or story map. As described herein, the user responds to the given prompts via a story map to create a story. Several of the story map prompts build on the game user's earlier ideation on the chosen character's possible goals, obstacles, and solutions within the chosen environment. Several other story map prompts ask the game user to create new story content.

It is noted that while the method 600 illustrates nine prompts that ask the user to both build on the ideas created earlier and to generate new information, any number of prompts may be utilized. Through the prompts, the user examines and explains in greater detail the connections between the chosen character's goal, obstacle to that goal, and the imagined solution. The character, environment, character's goal, obstacle, and solution have been chosen earlier in the game. However, the user must still define other key parts of their story as well as a story conclusion. The method 600 may have the game user further delve into empathy with the character. For example, one prompt has the user explain how the character reacts to the obstacle. Another prompt asks the user to explain how the solution affects the character. It is noted that the prompts may be associated with the sheets described with reference to FIGS. 1A-5C or may be provided via a separate sheet that is in the form of a path or map.

The user is directed to create both a written and visual response to each prompt. The visual response may be in the form of drawing, collage or other means. The user may choose to work on either the visual part or the written part first. This allows for creativity and freedom to develop and explain ideas. For example, a user may create a free form and whimsical sketch in response to a prompt, and then use the written portion to explain the meaning in the drawing. By completing the nine story map prompts, the user creates a full first draft of a unique story with sketches.

At 602, a user may be prompted to describe a chosen environment. The prompt may be in any appropriate form. In another aspect, the method 600 may provide a space for a user to enter a response. At 604, a user may be prompted to describe a chosen character's goal. At 606, a user may be prompted to imagine and describe an unexpected visitor. At 608, a user may be prompted to describe how the chosen environment changes. At 610, a user may be prompted to describe an obstacle. At 612, a user may be prompted to describe how the chosen character reacts to the obstacle. At 614, a user may be prompted to describe a solution to the obstacle. At 616, a user may be prompted to describe how the solution affects the chosen character. At 618, a user may be prompted to describe a conclusion.

By answering the story prompts, the game user must examine and articulate the connections between the chosen character's goal, obstacle to that goal, and the imagined solution within a specific environmental context. This adds realism to the critical thinking activity within the game and increases the game user's empathy with the character, where the character is a stand-in for a product end-user. By investigating the character's goals, obstacles to the goals, and generating possible solutions for the character, the game user has completed a challenging design process that is parallel to the type of exploration done in professional design studios.

Figure 7:
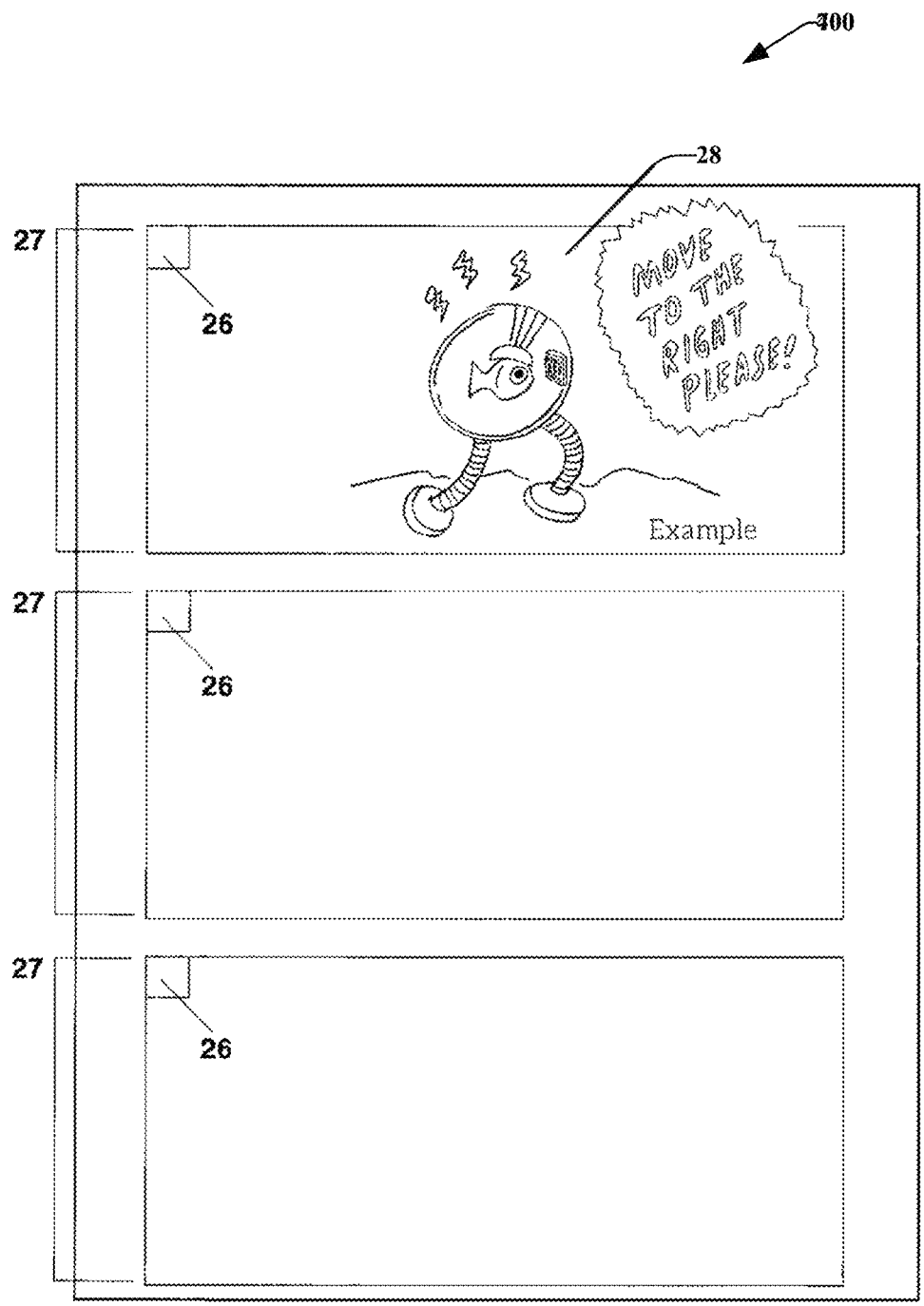
FIG. 7 is an exemplary page of a paper-based design system showing prompts for creation of at least one visual representation of the story draft of FIG. 6 in accordance with various disclosed aspects.

Turning to FIG. 7, with reference to FIG. 6, there is a sheet 700 comprising one or more frames 27 that may receive visualizations of a story scene created by responding to prompts of FIG. 6. An example of a story scene visualization 28 is shown. Space for the user to denote the consecutive numerical order of each frame 26 is shown. Game users are provided with multiple pages, each page including multiple frames 27. In the first embodiment, game users are provided with approximately 100 of the frames 27 in which to illustrate their story. Game users may make copies of pages of more frames 27 if needed to illustrate all parts of their story. Visualizations may be done through drawing, collage, or other visual means. The process of translating the first draft created during the story map exercise into a series of illustrated frames encourages the game user to review and edit their work, and is an opportunity to break down and review the story elements. The process of story creation and illustration provides a fun and engaging way to participate in the design process. The process of analyzing a character's goals, obstacles, and generating solutions may be done in a simple, dry way through diagramming. In contrast, storytelling is an engaging and vibrant way to explore character needs and connect them to solutions.

Figure 8:
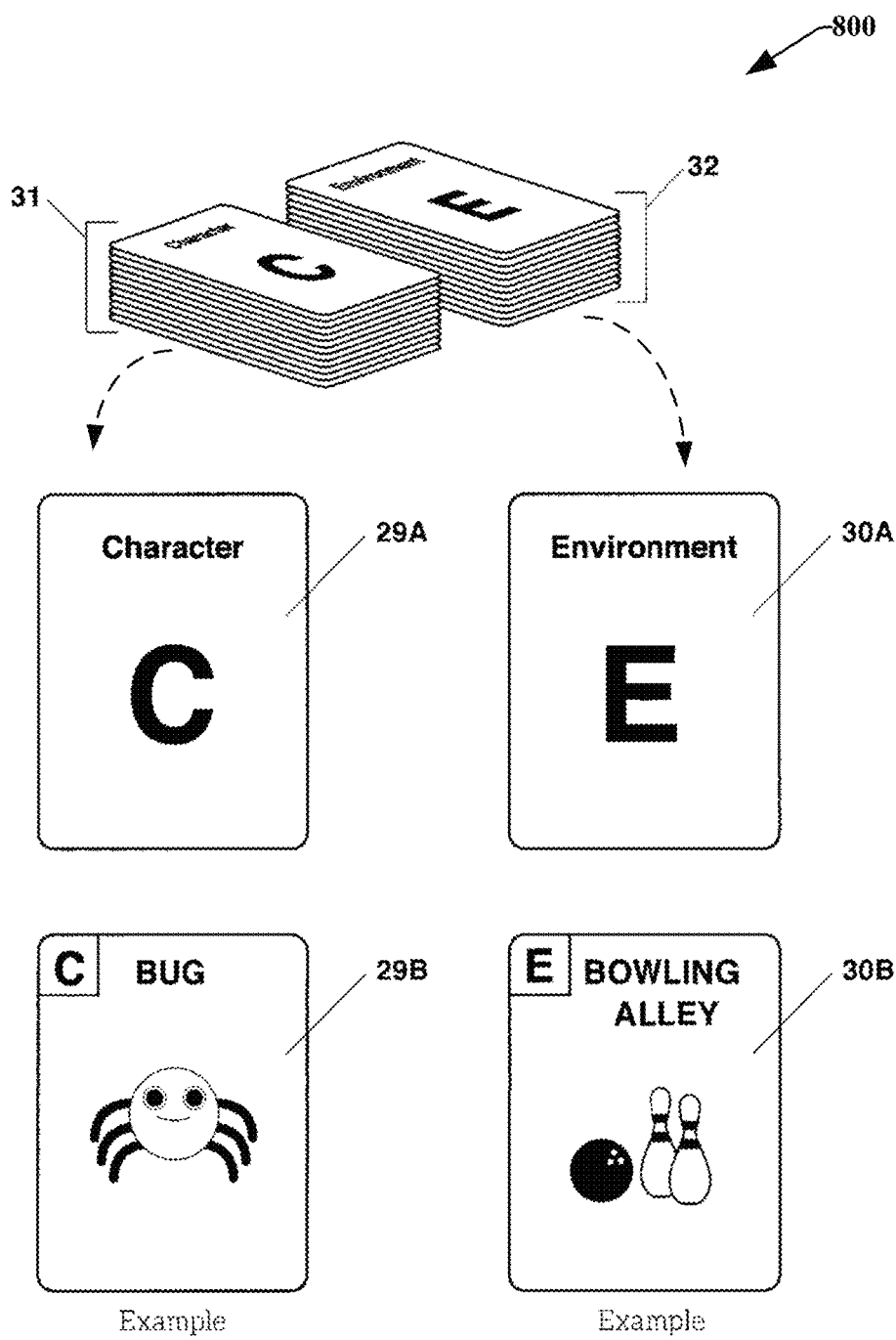
FIG. 8 is an exemplary card system with a character set and an environment set in accordance with various disclosed aspects.

Referring to FIG. 8, there is a card system 800 for developing design skills in accordance with various disclosed embodiments. The card system 800 may comprise one or more sets of cards, such as character card set 31 and environmental card set 32. Side 29A of each character card may be identical and side 29B may be unique for a specific character. Similarly, side 30A of each environmental card may be identical to each other. Side 30B may be unique for a specific environment.

In at least one embodiment, sides 29B and 30B may be blank and may allow a user to create different characters and environments. For instance, the user may draw characters on each card in the character card set 31 and may draw environments on each environmental card set 32. In an example, the cards may comprise an erasable surface that allows a user to draw and erase characters or environments. As another example, the cards may comprise base characters or environments and a user may embellish or add additional characteristics to the cards.

Moreover, the character card set 31 and environmental card set 32 may be printable from digital files. For example, a computing system may provide a digital template to a user.

The user may create characters and/or environments via the computing system and may print cards according to the template.

In an exemplary game, the user places all of the cards with sides 29A and 30A up, so as to hide the identity of the characters and the environments. The user chooses one character card from the character card set 31 and one environmental card from the environmental card set 32. The game user describes traits of that character and traits of that environment. The remainder of the game may utilize various aspects as described herein. For instance, the user may be prompted to describe traits of a character, goals, obstacles, and solutions. The game user imagines and describes one or a plurality of goals for chosen said character in chosen environment. The game user imagines and describes one or a plurality of obstacles faced by chosen said character in chosen environment. The game user imagines and describes one or a plurality of solutions for chosen said character that allows the character to achieve one or a plurality of said goals and/or overcome one or a plurality of said obstacles.

According to another embodiment, character card set 31 may comprise side 29B (e.g., the face side) with a number of prompts for a player to describe a trait of the character, it is noted that the prompts may be open-ended as described herein. These prompts are hidden when the cards are face down. Each card of the character card set 31 may contain different prompts. The user may select a number of the prompts to build a character and/or traits of the character. For instance, a character prompt may prompt a user to pick an object in the room and use personification to describe the object's personality. In an example, the user may pick a lamp and may describe the lamp as bright and cheery. In another example, a character card may prompt a user to pick a person from history and describe that person's personality. Additionally, prompts may ask a user to describe a character's hobbies, likes/dislikes, talents, weaknesses, what makes the character happy/sad/mad, etc.

Similarly, each environment card of the set of environment cards 32 may include the side 30B (e.g., face side) with a prompt for the player to describe the traits of an environment, it is noted that the prompts may be open-ended as described herein. By responding to prompts, the player generates environments. Within this game, an environment can be any place. When the environment cards are all placed face side down, the environment trait prompts are hidden from the player, adding a sense of surprise. Some exemplary prompts may include: What is someplace very beautiful?; What is someplace impossible to get to?; What is someplace very cold?; and What is someplace you'd never want to go to?. Possible questions to help the player describe environment traits may include: What sounds do you hear in this environment?; What kind of smells are in this environment?; and What is the weather like in this environment?.

Figure 8A:
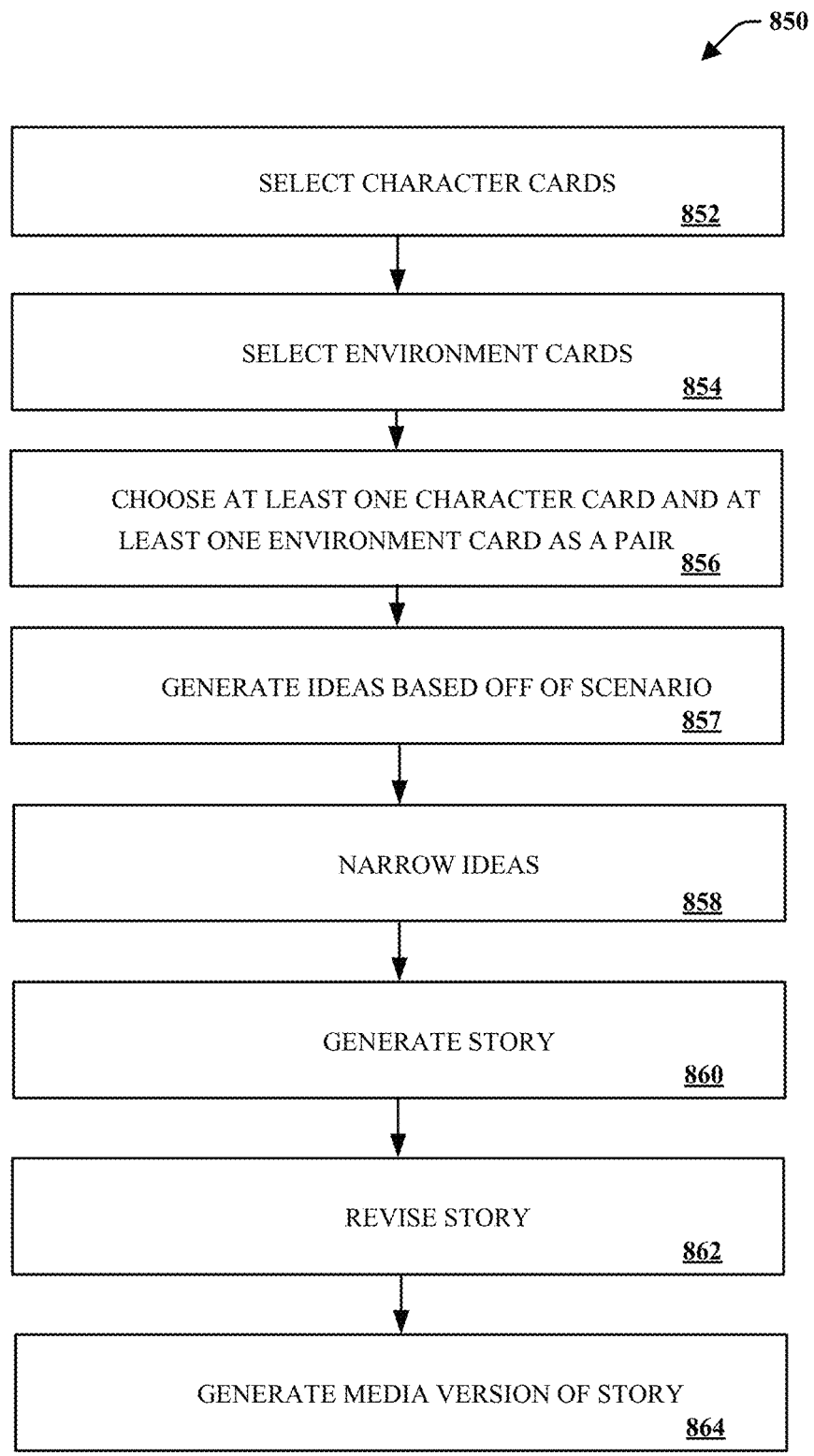
FIG. 8A is a method for creating a story draft based on the card system of FIG. 8 in accordance with various disclosed embodiments.

With reference to FIG. 8A there is an exemplary method 850 associated with a card game in accordance with various described embodiments. As noted herein, the steps may be preformed in different orders or the like.

At 852, character cards may be placed face down to hide prompts. One or more character cards may be selected from the set provided. The suggested number of character cards to select is five. Each card contains prompts to describe a character. By responding to card prompts, the player creates a character. Players are encouraged to describe emotional as well as visual traits. Players may respond to prompts verbally, through written answers, and/or visual representation (drawing, sculpture, etc.) for each chosen character card. The process of generating multiple characters is an example of an activity that requires divergent thinking.

At 854, environment cards may be placed face down to hide prompts. One or more environment cards may be selected from the set provided. The suggested number of environment cards to select is five. Each card contains prompts to describe an environment. By responding to card prompts, the player creates an environment. Players are encouraged to describe sensory details for each chosen environment card. (e.g., smells, sounds, and/or visual representation drawing, sculpture, etc.) The process of generating multiple environments is an example of an activity that requires divergent thinking.

At 856, at least one character card is chosen and at least one environment card is chosen. In an example, the process of choosing a character or environment may be randomized via a dice roll, computer algorithm, wheel spinner, coin flip, or the like. The pairing of a character and environment creates a scenario to explore. The player brainstorms what might happen if the chosen character were in the chosen environment. First, the player describes one or multiple potential goals for the character. Then the player brainstorms one or multiple potential obstacles for the chosen character in the chosen environment. Finally, the player brainstorms one or multiple potential solutions to help the character overcome a potential obstacle. The player may be prompted to explore different sets of goals, obstacles, and solutions. For instance, the user may be prompted to explain goals, describe how a character may react to obstacles, describe how an environment may change, and the like. It is noted that the user may be prompted for various other actions as described herein.

Players may communicate ideas verbally, through written answers, and/or visual representation (drawing, sculpture, etc.). The process of generating multiple responses to each prompts is an example of an activity that requires divergent thinking.

At 857, ideas may be generated based off of the scenario. For instance, the player may review the scenario and may think of a wide variety of obstacles, goals, or othering things that may occur for a particular scenario. At this reference number 857, the player is free to imagine and brainstorm without constraints.

At 858, ideas may be narrowed to exercise convergent thinking. For example, the player reviews all of the potential solutions described, and chooses one. The player reviews all of the potential obstacles, and chooses an obstacle that was affected by the chosen solution. The player reviews all of the potential goals, and chooses one. The player is focusing on one solution, one obstacle and one goal, in order to explore the relationships and between that solution, obstacle and goal. This content is the basis for the story that the player will create.

At 860, a story map is utilized to create a draft of a story based on the character, environment, goals, obstacles, and/or solutions. The story map may be a template for a story outline. The prompts can be arranged in multiple sequences, to vary the sequence of events of the story. The player must respond to the provided prompts in order to generate the story draft. The story map may take multiple embodiments. One embodiment is a list of prompts for the player to respond to. Another embodiment is a "path" with story prompts written along the path. A player must respond to one prompt on the path in order to proceed to another prompt, such as described with reference to FIG. 12. Another form for the story map is a set of cards, provided in addition to the character and environment cards. Story map cards are divided into two categories; primary story cards, which must be used, and supplementary story cards, from which the player may choose a select number from all the supplementary story cards provided. Players may communicate ideas verbally, through written answers, and/or visual representation (drawing, sculpture, etc.).

At 862, the story draft generated is reviewed and revisions may be made. A template of evaluation criteria may be provided.

At 864, a media version of the story is generated through comic book frames, computer screens, pictures of physical models, sound recordings, or the like. In an example, comic book frames may allow the player to illustrate the events and sequence of the story they created.

Figure 9:
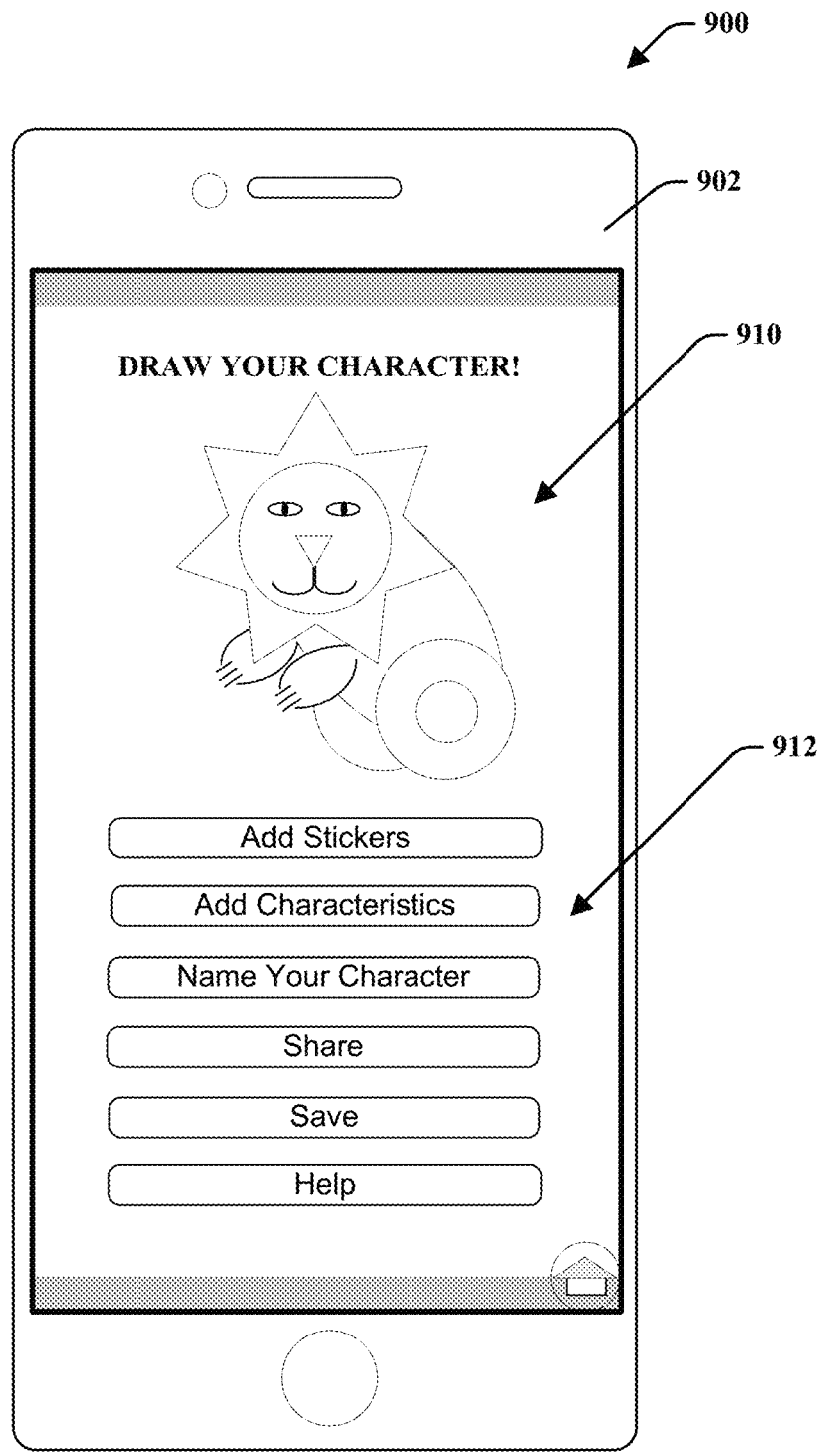
FIG. 9 is a display screen of a design system for creating a character in accordance with various disclosed embodiments.
Figure 10:
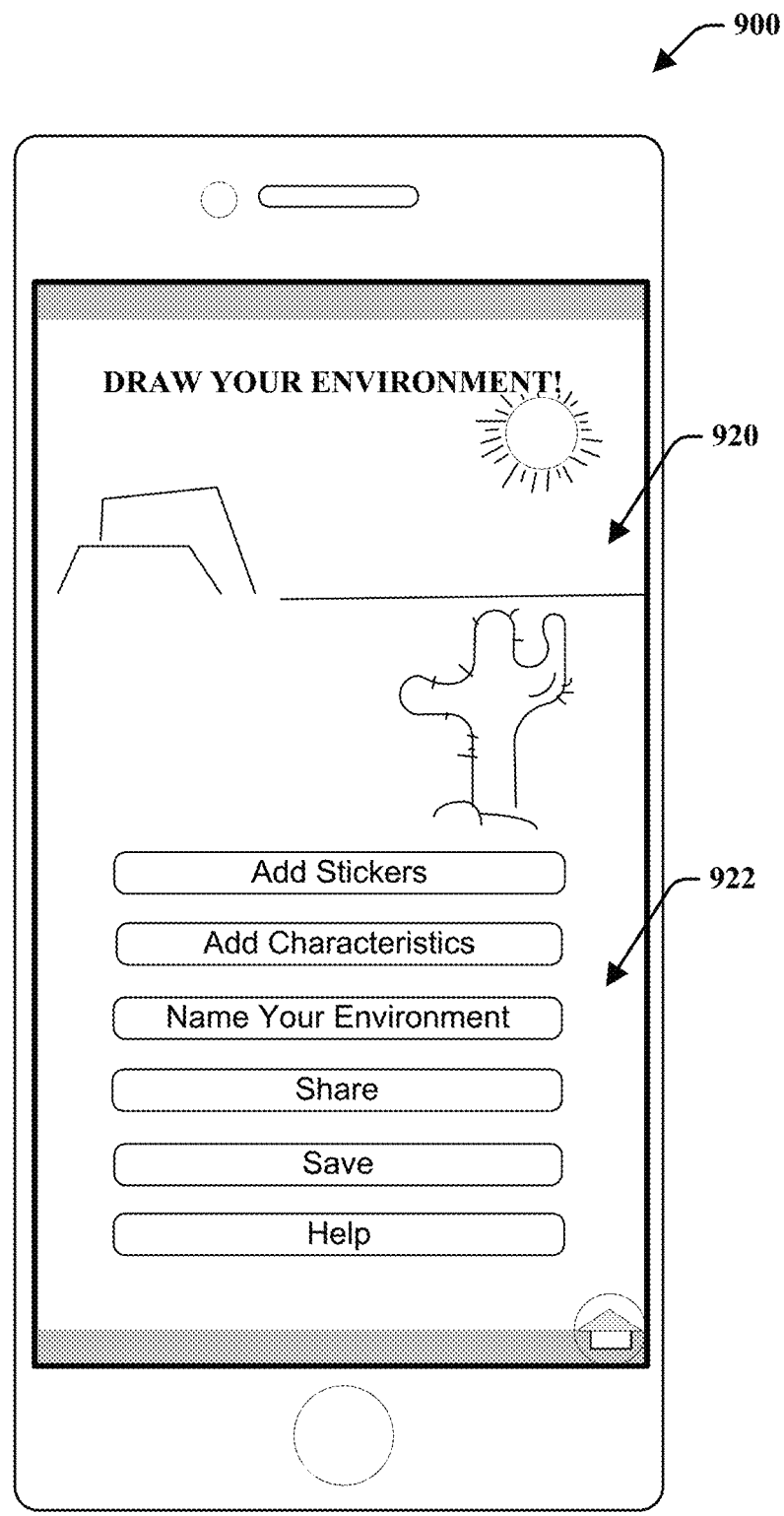
FIG. 10 is a display screen of a design system for creating an environment in accordance with various disclosed embodiments.
Figure 11:
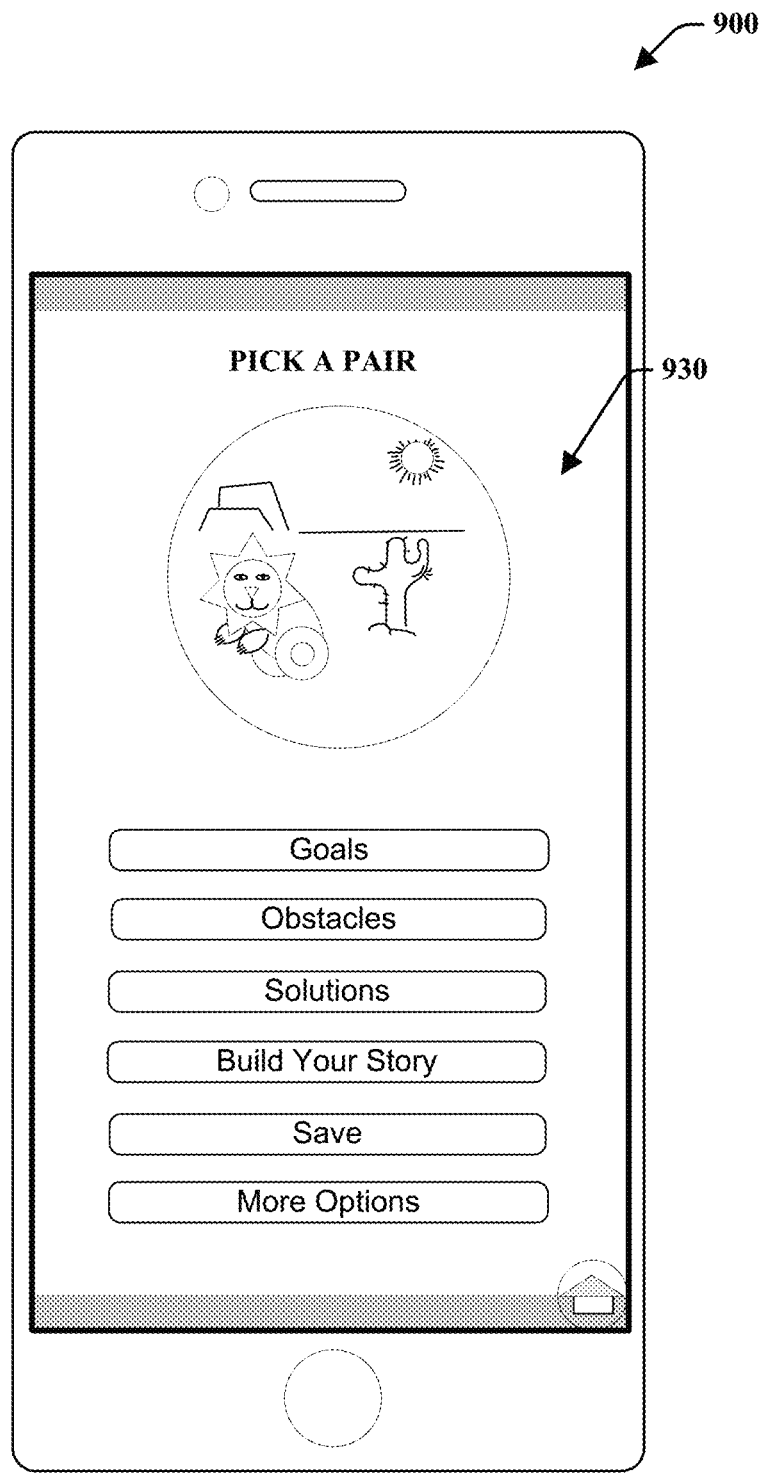
FIG. 11 is a display screen of a set including a character and an environment in accordance with various disclosed embodiments.

Turning now to FIGS. 9-11, there is an exemplary design system 900 on a user device 902. FIGS. 9-11 illustrate exemplary renderings on the user device according to various disclosed aspects. It is noted that the design system 900 may primarily include a memory and a processor. The memory may be configured for storing computer executable instructions and the processor may facilitate operation of the computer executable instructions. It is noted that system 900 may include one or more devices, such as a first user device, a server, and a second user device.

In embodiments that utilize a digital format of the game, when instructed to make a visual representation of characters or environments, the game user can do this in multiple ways. The game user may create a digital drawing or a digital collage from existing images or from their own drawings or photos, as described herein. In another example, the user may provide audio input and the system 900 may utilize voice recognition software. The system 900 may recognize certain instructions or objects (e.g., goldfish, hat, glasses, etc.) and may render an appropriate image. This may be particularly useful for users with reduced motor skills.

The design system 900 may include similar aspects as described with reference to the paper versions of this disclosure. As shown in FIG. 9, a user may be prompted by the system 900 to draw a character 910. As noted herein, the character 910 may be any character and may be completely fanciful. In an example, the user device 902 may comprise a touch screen that allows the user to draw the character on the user device 902. In another example, the user device may comprise a camera and that may capture a hand drawn character.

The system 900 may provide various user options 912 that may allow the user to add digital stickers, save characters, name the character, share the character with friends via a social network, or the like. In an aspect, the system 900 may allow the user to create any number of characters. As described herein, the user may add characteristics for the character by answering a number of questions, such as those described with reference to FIG. 1A. It is noted that the questions may be presented via another screen, pop-ups, fly-outs, audio, or the like.

FIG. 10 illustrates a prompt for a user to create an environment 920, similar to the prompts described with reference to FIGS. 2A-B. In an aspect, the user may access a number of options 922 that may be different from the options of FIG. 9. As described herein, the user may add characteristics for the environment by answering a number of questions, such as those described with reference to FIG. 2A. It is noted that the questions may be presented via another screen, pop-ups, fly-outs, audio, or the like.

It is noted that the system 900 may allow users to share their environments and characters with other users. Moreover, users may download environments and characters created by other users or prepopulated by the system 900. In some embodiments, users may be restricted from downloading other users' created content but may view the content for inspiration and ideas. This may force users to utilize their own imagination.

In FIG. 11, the system 900 prompts the user to select one or more character and one or more environments from previously created characters and environments. In one example, the system 900 may randomly select characters and environments. This may lead to odd combinations that may force users to think more creatively. The user is then prompted to enter goals, obstacles, solutions, and build a story as described with reference to the various described embodiments.

System 900 may include prompts that include animations, audio, visual, tactile (e.g., vibration) or the like. In another aspect, the system 900 may comprise an audio record that allows a user to record messages, stories, or the like.

Figure 12:
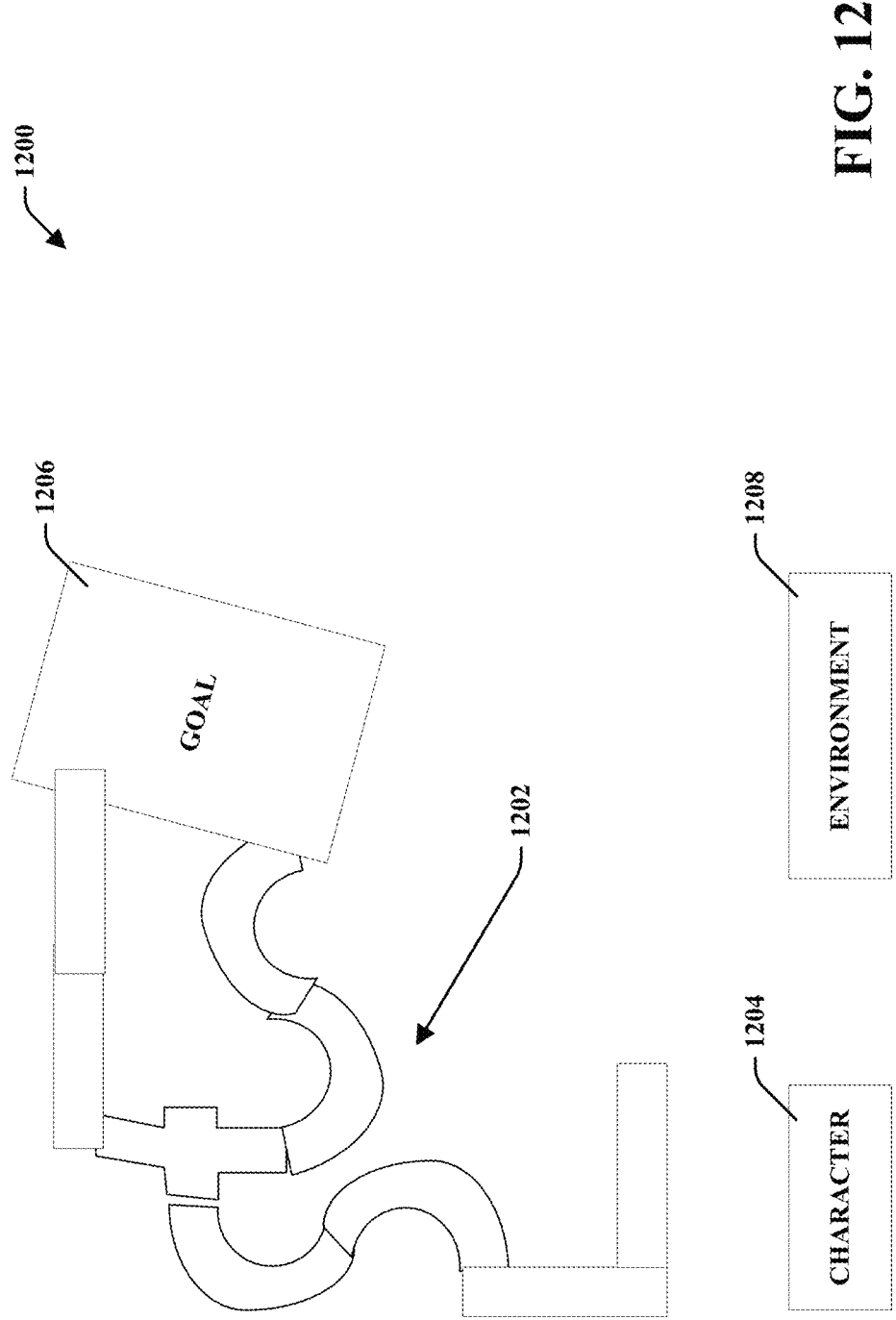
FIG. 12 is a story path apparatus for generating a story in accordance with various disclosed embodiments

Turning now to FIG. 12, there is an exemplary board game 1200 embodiment in accordance with various disclosed aspects. It is noted that the board game 1200 may be utilized with cards, paper versions, electronic versions or the like. In an aspect, the board game 1200 may comprise a story map that may be created by a user. For instance, the board game 1200 may include a number of path pieces 1202 to travel along. Path pieces 1202 and goal pieces 1206 may be arranged in any order. This allows users to create their own map and exercise their creativity. In some instances, the user may set the path pieces 1202 up in a manner that reaches a goal piece 1206. In other instances, the user may place goals between path pieces 1202 or may create paths that do not lead to any goal piece 1206. It is noted that a user may create or select a character 1204 and environment 1208 as described herein. For instance, the user may be dealt cards as described with reference to FIG. 8. Path pieces 1202 may be of various shapes and may allow a user to make decisions on a direction for a character to travel.

In one aspect, the path pieces 1202 may include prompts that prompt a user to identify characteristics of character 1204 and/or environment 1208. In another aspect, the prompts may include obstacles that a character must overcome as it heads to the goal piece 1206. The various pieces may comprise erasable surfaces so that users may write or draw on the pieces. In another aspect, the pieces may be attachable with each other, such as via magnets, notches, fasteners or the like. Moreover, the board game 1200 may be utilized with cards, paper versions, digital versions, or other embodiments described herein. It is noted that pieces may comprise wood, plastic, paper, board (e.g., cardboard, cork board, etc.), or other materials. Moreover, some pieces may be mandatory for the path to be completed while others may be option (e.g., give your character a new outfit).

As an exemplary game play, the user selects a character 1204 and an environment 1208. The user is prompted to define the characteristics of the character 1204 and environment 1208. The user may be prompted to fill out information on path pieces, such as "define a challenge" and make a solution to the challenge. As the user builds the story map, a story unfolds for the character's journey to the goal. Once the path is finished, the user may be prompted to generate a media representation, such as a video, series of image, text, audio, or the like.

What has been described herein may be altered and will still be in the scope and spirit of this disclosure. For instance, a game may be altered to be played with multiple players. Players may take turns creating characters, environments, identifying characteristics, goals, obstacles. Moreover, different users' characters and environments may be pooled and randomly grouped together. Players may then take turns creating scenarios from the pool of characters and environment. Additionally or alternatively, players may co-create characters, environments, scenarios, and may collaborate to fill out the Story Map and create full stories. In another example, players may chose characters, environments, goals, or obstacles for other players who must come up with solutions.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A story path apparatus for a generation of a media story, comprising:
   a plurality of path pieces, wherein each of the plurality of path pieces comprises indicia operatively providing at least one prompt for a user to identify an obstacle, a solution and a goal for a character based on an environment; and
   wherein the plurality of path pieces are operatively coupled together to form a path comprising a series of instructions, wherein the indicia identify whether different path pieces of the plurality of path pieces should be coupled together, wherein the plurality of path pieces are operatively couplable in different arrangement such that a user may be prompted to identify the obstacle, the solution and the goal in different orders such that prompts may be randomized to provide flexibility in creation of a story path and direct creation of media stories through such randomization.

2. The story path apparatus of claim 1, wherein each of the path pieces comprise at least one of wood, plastic, paper, or board.

3. The story path apparatus of claim 1, wherein at least one path piece of the plurality of path pieces comprises an erasable surface.

4. The story path apparatus of claim 1, further comprising a goal piece that is operatively coupled to at least one path piece of the plurality of path pieces.

5. The story path apparatus of claim 1, further comprising a card set comprising a character card set and an environment card set, wherein the character card set comprises a plurality of different characters and the environment card set comprises a plurality of different environments, wherein a representation of a character from the character card set identifies the character, and wherein a representation of an environment card from the environment card set identifies the environment such that the character and the environment are randomized.

6. A method utilizing a card set comprising a character card set and an environment card set, wherein
   each character card of the character card set comprises a back side and a face side, the face side of each character card comprising prompts that instruct a user to provide character traits and a representation of a character,
   each environment card of the environment card set comprises a back side and a face side, the face side of each environment card comprising prompts that instruct a user to provide environment traits and a representation of an environment from a set of different environment,
   the face side of each character card of the character card set is not viewable from the back side of each character card of the character card set, and the face side of each environment card of the environment card set is not viewable from the back side of each environment card of the environment card set, such that the set of character card sets are operatively randomized without revealing which of the characters or the character traits is on each card of the character card set and such that the set of environment card sets are operatively randomized without revealing which of the environments or the environment traits is on each card of the environment card set such that unexpected pairs of characters and environments are created when cards are drawn, and wherein the prompts that instruct a user to provide an environment trait and the character trait further randomize characters and environments such that generation of media stories is varied;
   the method comprising:
      drawing a random character card from the character card set;
      providing character traits for the random character card;
      drawing a random environment card from the environment card set;
      providing environment traits for the random environment card;
      identifying at least one goal for random character car;
      identifying at least one obstacle for the character based on the random environment card; and
      identifying at least one solution for the character to overcome the at least one obstacle.

7. The method of claim 6, further comprising:
   generating a story as a media representation comprising at least one of a series of frames, video, or audio.

8. The method of claim 6, further comprising:
   providing a visual representation of the random environment card, and
   providing a visual representation of the random character card.

9. The method of claim 6, wherein
   providing the character traits includes providing provide a character hobby, a character talent, or a character dislike.

10. The method of claim 6, wherein
   providing the environment traits includes providing at least one of a prompt to instruct a user to provide at least one of an environment weather, an environment sound, and an environment smell.

* * * * *